(12) United States Patent
Kim et al.

(10) Patent No.: US 11,276,300 B2
(45) Date of Patent: Mar. 15, 2022

(54) METHOD FOR LEARNING LATEST DATA CONSIDERING EXTERNAL INFLUENCES IN EARLY WARNING SYSTEM AND SYSTEM FOR SAME

(71) Applicant: KOREA HYDRO & NUCLEAR POWER CO., LTD, Gyeongsangbuk-do (KR)

(72) Inventors: Dae Woong Kim, Sejong (KR); Nam Woo Choi, Gyeonggi-do (KR); Bum Nyun Kim, Gyeongsangbuk-do (KR); Hyoung Kyun Kim, Daejeon (KR); Ji In Kim, Seoul (KR); Ju Hyung Kang, Gyeongsangbuk-do (KR); Yong Hoon Park, Gyeongsangbuk-do (KR); Gun Woong Shin, Gyeongsangbuk-do (KR); Yang Seok Kim, Daejeon (KR); Young Sheop Park, Sejong (KR); Chi Yong Park, Daejeon (KR); Byoung Oh Lee, Daejeon (KR); Jong Seog Kim, Daejeon (KR)

(73) Assignee: Korea Hydro & Nuclear Power Co., LTD., Gyeongju-si (KR)

( * ) Notice: Subject to any disclaimer, the term of this patent is extended or adjusted under 35 U.S.C. 154(b) by 477 days.

(21) Appl. No.: 16/328,645

(22) PCT Filed: Aug. 29, 2017

(86) PCT No.: PCT/KR2017/009430
§ 371 (c)(1),
(2) Date: Feb. 26, 2019

(87) PCT Pub. No.: WO2018/044041
PCT Pub. Date: Mar. 8, 2018

(65) Prior Publication Data
US 2021/0287525 A1 Sep. 16, 2021

(30) Foreign Application Priority Data

Aug. 29, 2016 (KR) .................. 10-2016-0110309

(51) Int. Cl.
*G08B 31/00* (2006.01)
*G06N 20/00* (2019.01)
*G08B 21/18* (2006.01)

(52) U.S. Cl.
CPC ............ *G08B 31/00* (2013.01); *G06N 20/00* (2019.01); *G08B 21/182* (2013.01)

(58) Field of Classification Search
CPC ....... G08B 31/00; G08B 21/182; G06N 20/00
See application file for complete search history.

(56) References Cited

U.S. PATENT DOCUMENTS 8,600,917 B1 * 12/2013 Schimert .............. G06N 20/00
706/14
10,618,202 B2 * 4/2020 Maruyama .......... B29C 37/0096
(Continued)

FOREIGN PATENT DOCUMENTS

CN 101617348 A 12/2009
CN 103488135 A 1/2014
(Continued)

OTHER PUBLICATIONS

Chinese Office Action dated Jun. 1, 2020 in CN Application No. 201780053551.6.

*Primary Examiner* — James J Yang
(74) *Attorney, Agent, or Firm* — Occhiuti & Rohlicek LLP

(57) ABSTRACT

The present invention provides a method for learning latest data considering external influences in an early warning system, and the early warning system for same. The method for learning latest data considering external influences comprises the steps of: an early warning processing device
(Continued)

categorizing device monitored variables according to external influences; and the early warning processing device differently applying a pattern learning method for each of the categorized monitored variables.

12 Claims, 5 Drawing Sheets

(56) References Cited

U.S. PATENT DOCUMENTS

| | | |
|---|---|---|
| 2009/0278680 A1 | 11/2009 | Hollender |
| 2012/0271826 A1 | 10/2012 | Kim |
| 2012/0316835 A1 | 12/2012 | Maeda et al. |
| 2013/0297249 A1 | 11/2013 | Thompson |
| 2015/0081599 A1* | 3/2015 | Dobler .................. G01R 31/00 706/12 |
| 2018/0348747 A1* | 12/2018 | Lavid Ben Lulu .... G06N 20/00 |

FOREIGN PATENT DOCUMENTS

| | | |
|---|---|---|
| CN | 104285189 A | 1/2015 |
| CN | 105182450 A | 12/2015 |
| CN | 105320123 A | 2/2016 |
| JP | 2003303020 | 10/2003 |
| JP | 2005283269 | 10/2005 |
| KR | 1020090021697 | 3/2009 |
| KR | 100997009 | 11/2010 |
| KR | 101065767 | 9/2011 |
| WO | 2011125130 A1 | 10/2011 |

* cited by examiner

METHOD FOR LEARNING LATEST DATA CONSIDERING EXTERNAL INFLUENCES IN EARLY WARNING SYSTEM AND SYSTEM FOR SAME

CROSS REFERENCE TO RELATED APPLICATIONS

This application is a National Phase under 35 U.S.C. 371 of International Application No. PCT/KR2017/009430 filed on Aug. 29, 2017, which claims priority to Korean Application No. 10-2016-0110309 filed on Aug. 29, 2016.

TECHNICAL FIELD

The present invention relates to a method for learning past data in an early warning system and, more particularly, to a method for learning latest data in an early warning system.

BACKGROUND ART

An early warning system is a system used for preventing a breakdown of a machine in advance, and introduced and used in military, aviation and power generation fields.

A principle of the early warning system uses a method of making a prediction value by computing influences between correlated machines by using past normal driving data, and computing a residual by comparing the prediction value with a current value, such that a warning is generated when the residual passes the normal driving range.

Various mathematical methods are used for obtaining influence degrees between machines, and the representative method includes a kernel recurrence method, a nerve network method, a grouping method, and the like using a statistical method.

An early warning program is based on a pattern learning of past normal driving data, and data driven for one year or more is used for the pattern learning generally. This is designed for reflecting external environmental influences of the machine during four seasons of spring, summer, autumn and winter. However, the case of using data for past one year as described above may be problematic in the case that there is big difference between the external environment of a current machine and the environment of one year ago. This is because the possibility that false warning occurs is increased in the early warning owing to the driving environment change since the pattern leaning data is not the latest.

A practical effect may be obtained when the probability that false warning occurs is minimized in the early warning system. Otherwise, significant warning may be missed while an operator analyses numerous warnings, and concentration of the operator is decreased, and the warning generated by an actual problem of a machine may not be found. Accordingly, it is important to perform learning with the latest data by reflecting changes of driving conditions.

In the current early warning program, even in the case that external environment is changed during operating the early warning program, the change is not reflected in learning, and there is a problem that a user needs to recognize the change of the external environment and perform the pattern learning again for the changed external environment using manual tasks.

DISCLOSURE

Technical Problem

An object of the present invention it to provide a method for pattern learning of past data which is essential for operating an early warning system. More particularly, the present invention is to provide a method and system for learning the latest data considering external influences in an early warning system that is available to improve reliability of early warning by including the latest data for external environmental component of a machine such as air temperature, air pressure, humidity, sea water temperature, and the like in learning.

Technical Solution

According to an aspect of the present invention, the present invention provides a method for learning latest data considering external influences in an early warning system. The method includes categorizing, performed by an early warning processing device, machine monitoring variables according to external environment influence and applying, performed by the early warning processing device, pattern learning method differently for each of the categorized monitoring variables.

The step of categorizing according to the external environment influence includes calculating a degree of correlation between each of the machine monitoring variables and each of external environmental factors and categorizing the machine monitoring variables according to the calculated degree of correlation value.

The external environmental factors include at least one of air temperature, air pressure, humidity and sea water temperature.

The step of categorizing according to the calculated degree of correlation value may include: according to a first criterion and a second criterion that an operator designates in advance, wherein the first criterion has greater value than the second criterion, when the degree of correlation value is the first criterion or more or greater than the first criterion, categorizing the machine monitoring variables as a first group, when the degree of correlation value is from the second criterion or more or higher than the second criterion to the first criterion or less or smaller than the first criterion, categorizing the machine monitoring variables as a second group, and when the degree of correlation value is the second criterion or less or smaller than the second criterion, categorizing the machine monitoring variables as a third group.

The step of applying the pattern learning method differently may apply at least one of an automatic relearning method, a manual relearning method and a relearning unnecessary method to each of the monitoring variables of the first group, the monitoring variables of the second group and the monitoring variables of the third group.

The monitoring variables of the first group may be stored in an automatic relearning database, and the latest pattern learning may be automatically performed for the external environmental factor and the monitoring variables of the first group, when difference between a change of the external environmental factor and a learning pattern constructed in advance is a predetermined level or more.

The latest pattern learning may be manually relearned by an operator for the monitoring variables of the second group, when the early warning is determined to be from the external environmental factor when the early warning is generated.

The relearning may not be performed for the monitoring variables of the third group.

According to another aspect of the present invention, the present invention provides an early warning system using a method for learning latest data considering external influences. The early warning processing device configured to perform: categorizing machine monitoring variables according to external environment influence and applying pattern learning method differently for each of the categorized monitoring variables.

The categorizing according to the external environment influence includes calculating a degree of correlation between each of the machine monitoring variables and each of external environmental factors and categorizing the machine monitoring variables according to the calculated degree of correlation value.

The external environmental factors may include at least one of air temperature, air pressure, humidity and sea water temperature.

The categorizing according to the calculated degree of correlation value may include: according to a first criterion and a second criterion that an operator designates in advance, wherein the first criterion has greater value than the second criterion, when the degree of correlation value is the first criterion or more or greater than the first criterion, categorizing the machine monitoring variables as a first group, when the degree of correlation value is from the second criterion or more or higher than the second criterion to the first criterion or less or smaller than the first criterion, categorizing the machine monitoring variables as a second group, and when the degree of correlation value is the second criterion or less or smaller than the second criterion, categorizing the machine monitoring variables as a third group.

The applying the pattern learning method may differently apply at least one of an automatic relearning method, a manual relearning method and a relearning unnecessary method to each of monitoring variables greatly influenced by the external environmental factor, the monitoring variables of which influence from the external environmental factor is unclear, and the monitoring variables not influenced by the external environmental factor.

The monitoring variables of the first group may be stored in an automatic relearning database, and the latest pattern learning may be automatically performed for the external environmental factor and the monitoring variables of the first group, when difference between a change of the external environmental factor and a learning pattern constructed in advance is a predetermined level or more.

The latest pattern learning may be manually relearned by an operator for the monitoring variables of the second group, when the early warning is determined to be from the external environmental factor when the early warning is generated.

The relearning may not be performed for the monitoring variables of the third group.

Advantageous Effects

The method and system for learning considering external environment may minimize an occurrence of unnecessary early warning by automatically performing the latest pattern learning for a monitoring signal which has high correlation with an external environmental factor. In addition, the method and system enables an early warning system operator to concentrate on analyzing early warning actually occurred by machine disorder, and has an effect of improving efficiency and reliability of the early warning system operation.

MODE FOR INVENTION

Figure 1:
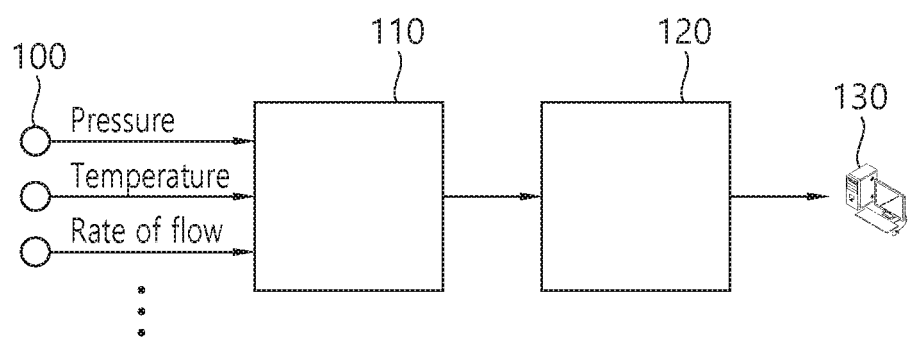
FIG. 1 is a diagram illustrating the conventional early warning system.

The present invention may have various modifications and various embodiments and specific embodiments will be illustrated in the drawings and described in detail in the detailed description. However, this does not limit the present invention to specific embodiments, and it should be understood that the present invention covers all the modifications, equivalents and replacements included within the idea and technical scope of the present invention.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

When it is described that a component is "connected to" or "accesses" another component, the component may be directly connected to or access the other component or a third component may be present there between. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, embodiments of the present invention will be described in detail with reference to the accompanying drawings and in describing the preferred embodiments with reference to the accompanying drawings, the same reference numeral will refer to the same or corresponding component regardless of the reference numeral and a duplicated description thereof will be omitted.

FIG. 1 is a diagram illustrating the conventional early warning system. Referring to FIG. 1, the conventional early warning system includes a measuring instrument 100 for measuring states of power plant machines, a data processing device 110 for receiving and storing monitoring signals (e.g., pressure, temperature, rate of flow, etc.) obtained from the measuring instruments 100 and converting them to digital data, an early warning processing device 120 for generating an early warning by analyzing the converted data, and an operator monitor 130 for an operator to check the device sate, early warning state, and the like.

Figure 2:
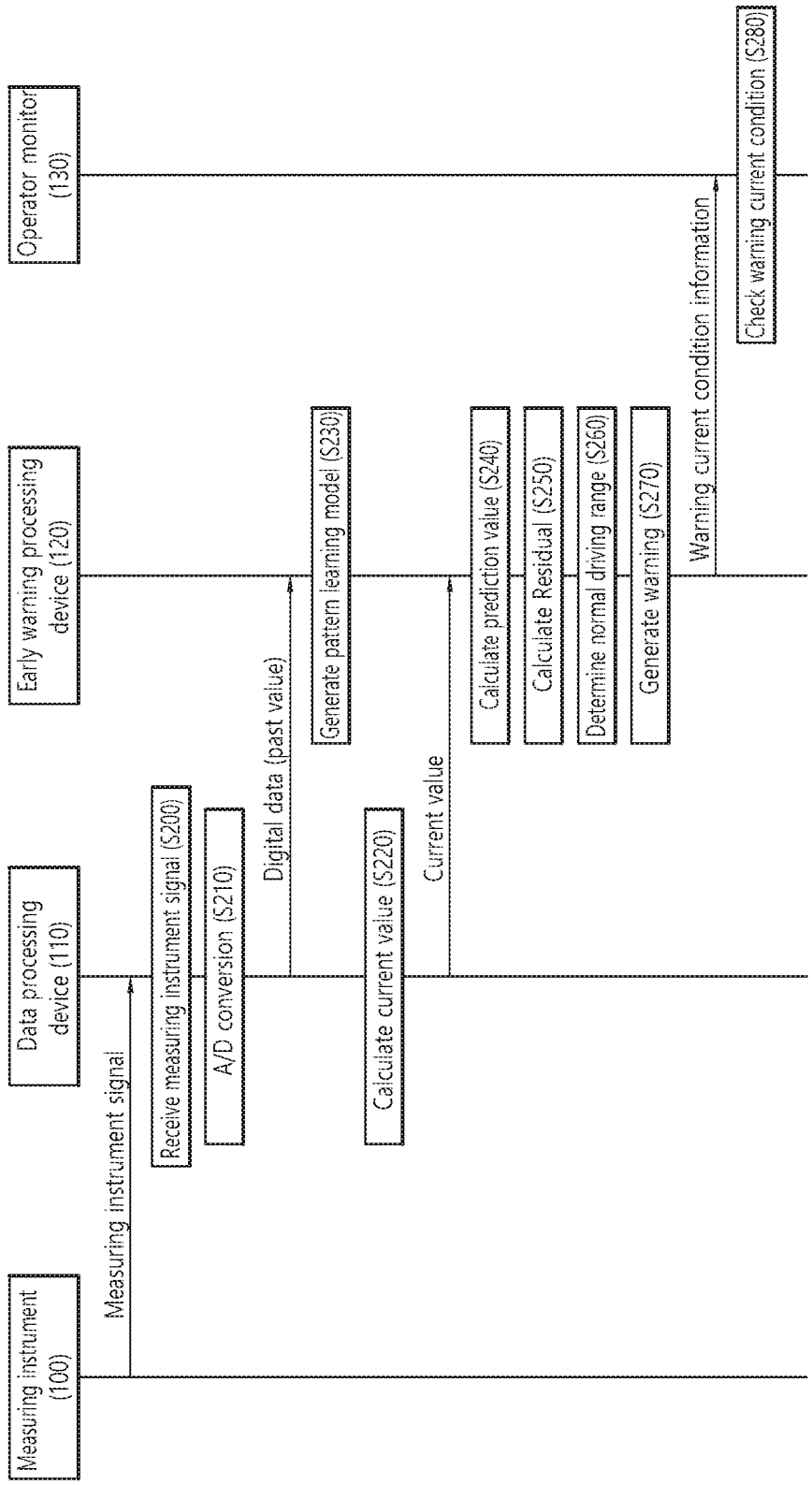
FIG. 2 is a flowchart illustrating a learning method in the conventional early warning system.

FIG. 2 is a flowchart illustrating a learning method in the conventional early warning system. As shown in FIG. 2, the data processing device 110 receives measuring instrument signals from the measuring instruments (step, S200).

The received measuring instrument signals are analogue signals, and the analogue signals are converted to digital data by going through data processing step (step, S210).

Then, the data processing device 110 calculates current values of the measuring instrument signals in real time (step, S220).

The early warning processing device 120 receives past measuring instrument signals during a predetermined period going through the data processing step from the data processing device 110, and generates a pattern learning model in advance (step, S230).

The calculated current values are transmitted to the early warning processing device 120, and the early warning processing device 120 calculates prediction values by using the pattern learning model generated in advance (step, S240).

Residuals (i.e., |current value−prediction value|) are calculated by using the current values and the prediction values (step, S250).

The residuals are compared with a normal driving range of each of the preconfigured monitoring variables (e.g., temperature, pressure, rate of flow, etc.) (step, S260). In the case that the residual passes the normal driving range, warning is generated (step, S270), and in the case that the residual does not pass the normal driving range, warning is not generated. At this time, the normal driving range for generating warning may be adjusted by an operator.

The early warning processing device 120 transmits warning current condition information to the operator monitor 130 such that the operator may check the warning current condition (step, S280).

The pattern learning program of the conventional early warning system is unavailable to identify which monitoring variable is influenced by external environment strongly or weakly, but learns past data of each monitoring variable for a predetermined period (e.g., 1 year) without any change and stores it as a learning model, and utilizes it for the next prediction value calculation.

Since an external environmental change is unavailable to be reflected in the case that the residuals are calculated by obtaining a prediction value using the conventional method, it is highly probable that false warning is generated. Accordingly, present invention provides a method for learning latest data by considering external environmental change when pattern learning is performed.

In an embodiment of the present invention, all monitoring target variables are categorized into three types and different learning methods are applied to each of the types.

A first type includes monitoring variables which are not influenced by external influences. Since such monitoring variables are not influenced by external influences, the conventional pattern learning model is applied without any change.

A second type includes monitoring variables which are influenced by external environment. Since values of the monitoring variables which are influenced by external environment are changed depending on external environmental factors, in the case that the change of the external environmental condition is not considered, reliability of the learning model may be degraded. Accordingly, for the monitoring variables of such a type, the latest pattern learning that reflects the changed external environment needs to be performed.

Lastly, a third type includes monitoring variables of which categorization are unclear on whether the monitoring variables are influenced by external environment or not. When it is analyzed by an operator that early warning is generated for the corresponding monitoring variables owing to change of external environment, like the case of the monitoring variables which are influenced by external environment, the latest pattern learning that reflects the changed external environment is performed, and when it is analyzed otherwise, the conventional pattern learning model is applied without any change.

Figure 3:
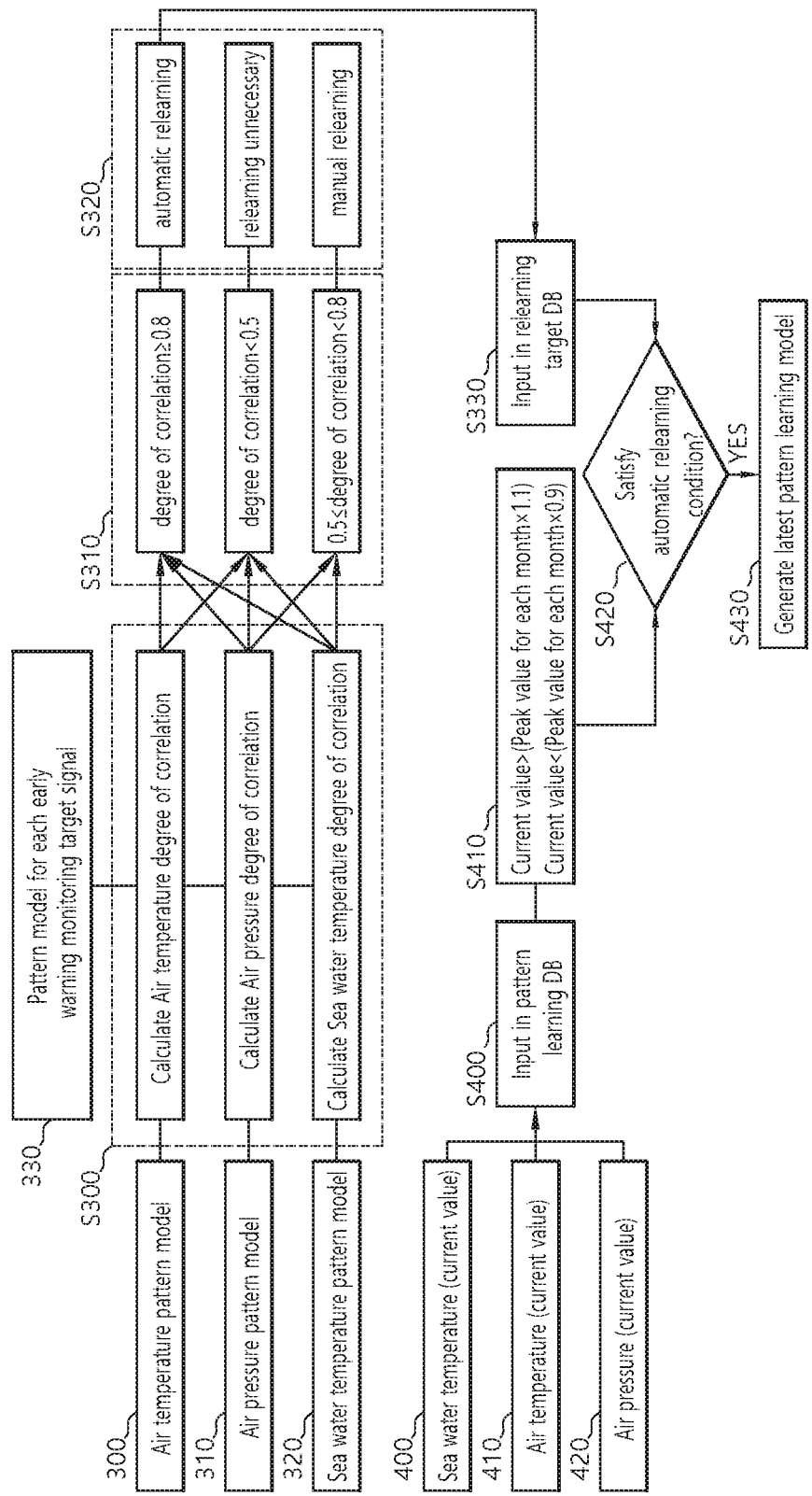
FIG. 3 is a flowchart illustrating a learning method according to an embodiment of the present invention.

FIG. 3 is a flowchart illustrating a learning method according to an embodiment of the present invention. Referring to FIG. 3, firstly, a degree of correlation is calculated by performing correlation analysis between pattern models 330 for each of all early warning monitoring target signals (for each monitoring variable) and pattern models (e.g., pattern models 300, 310 and 320 of air temperature, air pressure, sea water temperature, which are representative external environmental components) of external environment of a power plant (step, S300). At this time, the correlation calculation uses the correlation analysis which is generally used in statistical analysis. For example, the external environmental conditions such as external air temperature, air pressure, and the like during a past predetermined period and change of monitoring signals such as temperature, pressure, vibration, and the like of each machine are compared, and the degree of correlation may be obtained between each of the external conditions and the respective signals.

Using the correlation calculation result, a degree of correlation between the monitoring variable and the external environment is determined (step, S310), and the monitoring variables are categorized into automatic relearning group, relearning unnecessary group and manual relearning group (step, S320).

As a result of the correlation calculation, the case of [degree of correlation≥0.8] is a monitoring signal (monitoring variable) of which degree of correlation with external environment is high, categorized as the automatic relearning group and stored in a relearning target database (step, S330).

The case of [degree of correlation<0.5] is a monitoring signal (monitoring variable) of which degree of correlation with external environment is low and categorized as the group in which relearning is unnecessary.

The case of [0.5≤degree of correlation<0.8] is the case that determination of a degree of correlation with external environmental factors is unclear, and categorized as the manual relearning group. Later, when an early warning is generated in the monitoring signal in the manual relearning group, an operator performs an analysis on which the warning is caused by external environmental factors. As a result, when the cause is determined as the external environmental factors, the latest pattern learning is performed manually by the operator. On the contrary, in the case that an early warning is not generated, or even in the case that an early warning is generated, when the early warning is not caused by the external environmental factors, relearning is not required.

Meanwhile, the external environmental factor current values (values of monitoring variables such as sea water temperature, air temperature and air pressure 400, 410 and 420) measured in real time when a power plant is driven are inputted in a pattern learning database in which past external environmental factor pattern learning values are stored (step, S400). And then, the current values are compared with values for each month stored in the pattern learning database (step, S410).

The reason why the values are compared for each month is that the sea water temperature, air temperature and air pressure, which are the external environmental factors, are closely related with weather, and the weather of our country is tended to be changed for each month. When a current value (the currently measured values and the measured data are included in the measurement data, and it is available to identify the month of the data) is inputted, the current value is compared with a maximum value and a minimum value of the corresponding month which are pattern-learned and stored. When the difference is, for example, 10% or more, it is determined that the difference from the currently learned pattern is great, and it is recognized that automatic relearning is required.

The comparison is not necessarily performed for each month, but may be performed with minimum value/maximum value of every day. However, in that case, unnecessary warning may be generated more frequently.

As a result of the comparison step S410 of the current value and the maximum value and the minimum value for each month, when the difference occurs with a predetermined difference (e.g., 10%) designated by an operator, it may be determined that the change of the external environmental factor is great and the influence influences on the machine monitoring signal. That is, it means that the condition requiring the automatic relearning is required is generated (step, S420).

When the automatic relearning condition occurs, the automatic relearning is performed for external environmental variables (e.g., sea water temperature, air temperature and air pressure). Simultaneously, the automatic relearning is also performed for the monitoring variables in the relearning target database, and a new pattern model is generated (step, S430).

Figure 4:
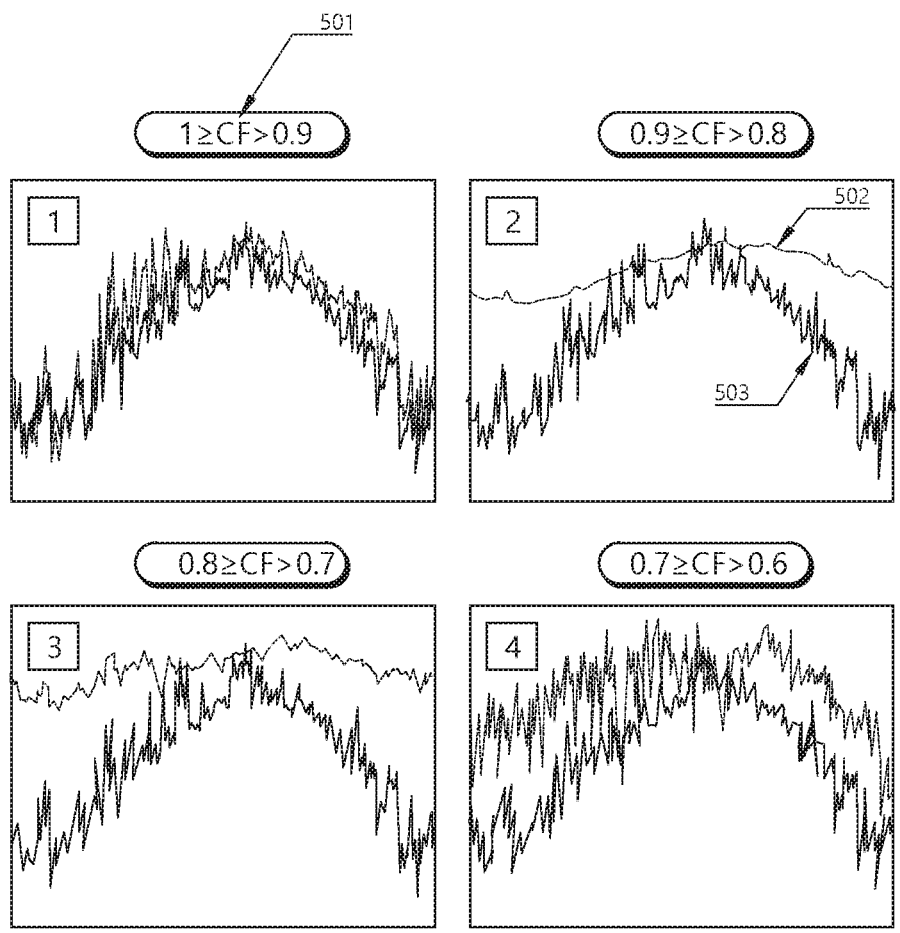
FIG. 4 is an example of correlation analysis drawings depending on a change of external environment (sea water temperature).
Figure 5:
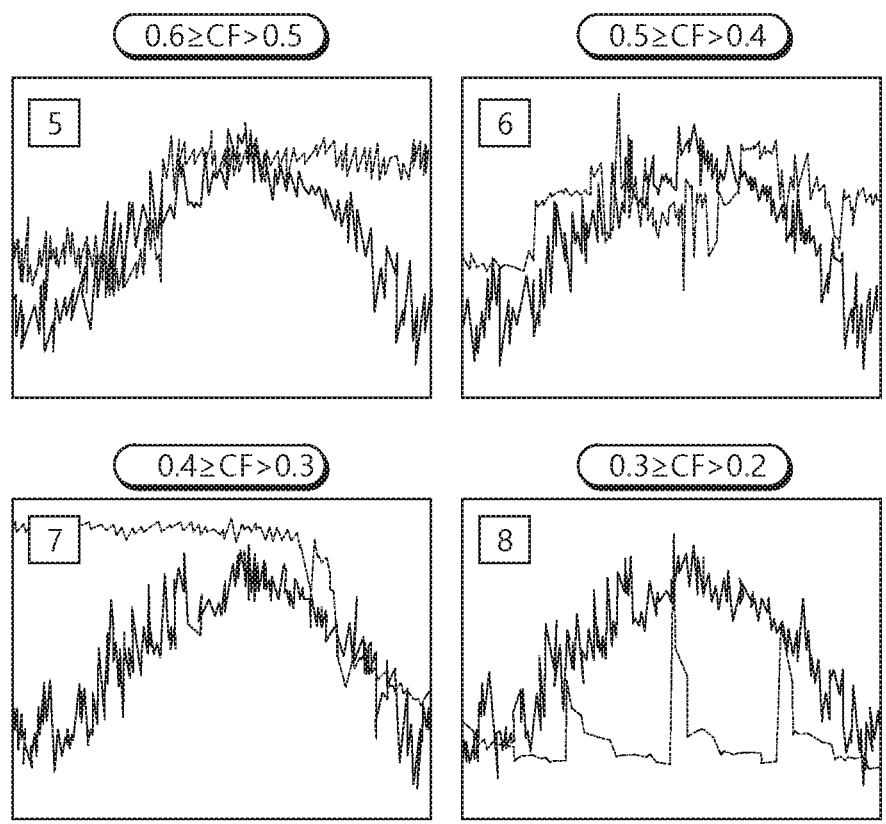
FIG. 5 is another example of correlation analysis drawings depending on a change of external environment (sea water temperature).

FIGS. 4 and 5 are examples of correlation analysis drawings depending on a change of external environment (sea water temperature). Referring to FIG. 4 and FIG. 5, each graph shows correlation drawing between external environment monitoring variable (sea water temperature) and an arbitrary machine monitoring variable. Each of the lines shows a past driving data pattern (solid line) 502 for one year and a pattern (dotted line) 503 of an arbitrary machine monitoring variable (pump bearing temperature, machine cooling heat exchanger inlet temperature, pump inlet flow, pump outlet pressure, generator oil tank level, etc.). Since the external environment monitoring variable of FIG. 4 and FIG. 5 relates to sea water temperature, the external environment monitoring variable changes with the highest value in July and August.

CF 501 of each graph shows a correlation factor, and it is shown that the pattern 503 of the external environment monitoring variable is very similar to the pattern 502 of the machine monitoring variable as the correlation factor increases.

Graph 1 of FIG. 4 shows the sea water temperature pattern and the machine cooling heat exchanger inlet temperature pattern. The patterns are very similar and the correlation factor is 0.9 or more, and it is identified that the correlation is very close. Accordingly, it becomes a target of the automatic relearning.

In Graph 2 of FIG. 4, the correlation factor is 0.9 or more, and categorized as the monitoring variable which is influenced by external environment and becomes a target of the automatic relearning.

Graphs 3 and 4 of FIG. 4 and Graph 5 of FIG. 5 correspond to the case that influence of external environment is unclear, and separate relearning is not required when an early warning is not generated, and the manual relearning is performed when an early warning is generated and it is determined that the cause of warning is from external environment. Graphs 6, 7 and 8 of FIG. 5 may be categorized as the case that the correlation factor is less than 0.5 and influenced by external environment. For example, Graph 8 shows the sea water temperature pattern and pump bearing vibration pattern, and there is no correlation between two patterns. The sea water temperature shows the pattern increased from January and having peak on August and decreased to December, but in the pump bearing vibration pattern, the pattern of having peak and decreased is repeated without regard to season or month. This case is categorized to the case that correlation is very low and there is no influence from external environment, and separate relearning is not required.

So far, various embodiments of the present invention are described. However, it is understood that the description is just for illustration and not to limit the scope of the present invention defined by the scope of the following claims. Accordingly, other embodiments are also within the scope of the following claims. For example, various modifications may be performed without departing from the scope of the present invention. Additionally, a part of the steps described above are independent from the order, and may be performed in different order from those of described above.

DESCRIPTION OF REFERENCE NUMERALS

| | | | |
|---|---|---|---|
| 100: measuring instrument | 110: | data processing device | |
| 120: early warning processing device | 130: | integrated center operator monitor | |
| 501: correlation factor | | | |
| 502: machine monitoring variable pattern | 503: | external environment monitoring variable pattern | |

The invention claimed is:

1. A method for learning latest data considering external influence in an early warning system, comprising:

categorizing, performed by an early warning processing device, machine monitoring variables according to external environment influence; and applying, performed by the early warning processing device, pattern learning method differently for each of the categorized monitoring variables, wherein the step of categorizing according to the external environment influence includes:

calculating a degree of correlation between each of the machine monitoring variables and each of external environmental factors; and categorizing the machine monitoring variables according to the calculated degree of correlation value, wherein the categorizing the machine monitoring variables according to the calculated degree of correlation value includes:
according to a first criterion and a second criterion that an operator designates in advance, wherein the first criterion has greater value than the second criterion, when the degree of correlation value is equal to or more than the first criterion, categorizing the machine monitoring variables as a first group,
when the degree of correlation value is from equal to or more than the second criterion to equal to or less than the first criterion, categorizing the machine monitoring variables as a second group, and
when the degree of correlation value is equal to or less than the second criterion, categorizing the machine monitoring variables as a third group.

2. The method for learning latest data of claim 1, wherein the external environmental factors include at least one of air temperature, air pressure, humidity and sea water temperature.

3. The method for learning latest data of claim 1, wherein the applying the pattern learning method differently applies at least one of an automatic relearning method, a manual relearning method and a relearning unnecessary method to each of the monitoring variables of the first group, the monitoring variables of the second group and the monitoring variables of the third group.

4. The method for learning latest data of claim 3, wherein the monitoring variables of the first group are stored in an automatic relearning database, and wherein a latest pattern learning is automatically performed for the external environmental factor and the monitoring variables of the first group, when difference between a change of the external environmental factor and a learning pattern constructed in advance is a predetermined level or more.

5. The method for learning latest data of claim 3, wherein a latest pattern learning is manually relearned by an operator for the monitoring variables of the second group, when the early warning is determined to be from the external environmental factor when the early warning is generated.

6. The method for learning latest data of claim 3, wherein the relearning is not performed for the monitoring variables of the third group.

7. An early warning system using a method for learning latest data considering external influence, comprising:
an early warning processing device configured to perform:
categorizing machine monitoring variables according to external environment influence; and
applying pattern learning method differently for each of the categorized monitoring variables,
wherein the categorizing according to the external environment influence includes:
calculating a degree of correlation between each of the machine monitoring variables and each of external environmental factors; and
categorizing the machine monitoring variables according to the calculated degree of correlation value,
wherein the categorizing according to the calculated degree of correlation value includes:
according to a first criterion and a second criterion that an operator designates in advance, wherein the first criterion has greater value than the second criterion, when the degree of correlation value is equal to or more than the first criterion, categorizing the machine monitoring variables as a first group,
when the degree of correlation value is from equal to or more than the second criterion to equal to or less than the first criterion, categorizing the machine monitoring variables as a second group, and
when the degree of correlation value is equal to or less than the second criterion, categorizing the machine monitoring variables as a third group.

8. The early warning system of claim 7, wherein the external environmental factors include at least one of air temperature, air pressure, humidity and sea water temperature.

9. The early warning system of claim 7, wherein the applying the pattern learning method differently applies at least one of an automatic relearning method, a manual relearning method and a relearning unnecessary method to each of monitoring variables greatly influenced by the external environmental factor, the monitoring variables of which influence from the external environmental factor is unclear, and the monitoring variables not influenced by the external environmental factor.

10. The early warning system of claim 9, wherein the monitoring variables of the first group are stored in an automatic relearning database, and wherein a latest pattern learning is automatically performed for the external environmental factor and the monitoring variables of the first group, when difference between a change of the external environmental factor and a learning pattern constructed in advance is a predetermined level or more.

11. The early warning system of claim 9, wherein a latest pattern learning is manually relearned by an operator for the monitoring variables of the second group, when the early warning is determined to be from the external environmental factor when the early warning is generated.

12. The early warning system of claim 9, wherein the relearning is not performed for the monitoring variables of the third group.

* * * * *